US010229677B2

United States Patent
Chen et al.

(10) Patent No.: US 10,229,677 B2
(45) Date of Patent: Mar. 12, 2019

(54) SMART LAUNCHING MOBILE APPLICATIONS WITH PREFERRED USER INTERFACE (UI) LANGUAGES

(71) Applicant: INTERNATIONAL BUSINESS MACHINES CORPORATION, Armonk, NY (US)

(72) Inventors: David S. C. Chen, Taipei (TW); Pei-Yi Lin, New Taipei (TW); Hung-Chih Liu, Taipei (TW); Yi-Lin Tsai, Taichung (TW); Der-Joung Wang, New Taipei (TW); Yen-Min Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 15/132,292

(22) Filed: Apr. 19, 2016

(65) Prior Publication Data
US 2017/0301348 A1 Oct. 19, 2017

(51) Int. Cl.
*G10L 15/22* (2006.01)
*G10L 15/26* (2006.01)
(Continued)

(52) U.S. Cl.
CPC .............. *G10L 15/22* (2013.01); *G06F 3/167* (2013.01); *G10L 15/26* (2013.01); *G10L 25/51* (2013.01); *G10L 2015/223* (2013.01)

(58) Field of Classification Search
None
See application file for complete search history.

(56) References Cited

U.S. PATENT DOCUMENTS 7,069,220 B2 * 6/2006 Coffman ................. G10L 15/22
704/270
9,002,699 B2 4/2015 Qin
(Continued)

FOREIGN PATENT DOCUMENTS

TW 201440014 A 10/2014

OTHER PUBLICATIONS

Microsoft, "Change the language used in apps", Applies to Windows 8.1, Windows RT 8.1, pp. 1-3, printed on Sep. 11, 2015, http://windows.microsoft.com/en-in/windows-8/use-different-language-app.

*Primary Examiner* — Michael N Opsasnick
(74) *Attorney, Agent, or Firm* — Michael A. Petrocelli

(57) ABSTRACT

A computer-implemented method and system launches an application with a preferred user interface (UI) language on a device. The method and system receive a voice command from a user to open an application on a device having a computer. The voice command is compared to a stored command language in an audio file device. The system and method initiates opening the application, in response to determining that the voice command matches the stored command language. The application is identified based on the voice command. The system and method determines a preferred language for the software application based on a language file stored on the computer readable medium and the language file being associated with the stored audio file. The method and system opens the application in response to the voice command, and sets the preferred language for a user interface (UI) of the device in response to the determined preferred language.

20 Claims, 5 Drawing Sheets

(51) Int. Cl.
*G10L 25/51* (2013.01)
*G06F 3/16* (2006.01)

(56) References Cited

U.S. PATENT DOCUMENTS

| | | | |
|---|---|---|---|
| 2002/0082844 A1* | 6/2002 | Van Gestel | G06F 3/16 704/275 |
| 2005/0086382 A1* | 4/2005 | Ramaswamy | H04L 67/36 709/246 |
| 2006/0074629 A1 | 4/2006 | Chiu et al. | |
| 2006/0119583 A1* | 6/2006 | Potera | H04M 1/72552 345/171 |
| 2011/0066634 A1* | 3/2011 | Phillips | G10L 15/22 707/769 |
| 2011/0288859 A1* | 11/2011 | Taylor | G10L 15/22 704/231 |
| 2014/0215330 A1 | 7/2014 | Lee | |
| 2014/0257788 A1* | 9/2014 | Xiong | H04N 21/25816 704/8 |
| 2014/0278419 A1* | 9/2014 | Bishop | G06F 3/16 704/249 |
| 2014/0297258 A1 | 10/2014 | Kiss | |
| 2014/0298222 A1 | 10/2014 | Kiss | |
| 2015/0029089 A1* | 1/2015 | Kim | G06F 3/011 345/156 |
| 2015/0205342 A1* | 7/2015 | Ooi | G06F 1/3206 713/323 |
| 2015/0379986 A1* | 12/2015 | Golding | G10L 15/08 704/246 |
| 2016/0171980 A1* | 6/2016 | Liddell | G10L 15/22 704/275 |
| 2016/0203002 A1* | 7/2016 | Kannan | G06F 9/4446 715/708 |

* cited by examiner

SMART LAUNCHING MOBILE APPLICATIONS WITH PREFERRED USER INTERFACE (UI) LANGUAGES

BACKGROUND

The present disclosure relates to a method and system for launching a software application with a preferred user interface (UI) language on a computer or a computer device.

Typically, a user interface of a device, for example, a mobile device, displays text in a language set by an operating system (OS) of the device. Thus, one way to change to UI language is to change the OS language setting. Changing the OS language setting requires the user to toggle through menus and change the settings. Also, the language setting change in the OS language settings, will change the language setting for all the applications on the device.

For example, known techniques may allow users to set a list of languages and a preferred order in which the user wants the languages or dialects to appear. An application may run on a device with a user interface language which is first on the list, and the user can initiate another language on the list. However, the selected language is adjusted for all applications on the device. In another example, the display language, for instance of a map or mapping application, can be determined using the location of the device. However, the language selected based on the location may not be preferred by the user.

SUMMARY

In one example, it would be beneficial for a user to select a language for an application on a device without changing the OS language or affecting other applications on the device. The language of the application being shown on the user interface of the device.

According to an aspect of the present invention, a computer-implemented method launches an application with a preferred user interface (UI) language on a device. A voice command is received from a user to open an application on a device having a computer. The method compares the voice command to stored command language in an audio file stored on a computer readable medium communicating with the device. The method initiates opening the application, in response to determining that the voice command matches the stored command language. The application is identified based on the voice command. A preferred language for the application is determined based on a language file stored on the computer readable medium and the language file is associated with the stored audio file. The method opens the application in response to the voice command, and setting the preferred language for a user interface (UI) of the device in response to the determined preferred language.

In another aspect according to the invention, a computer program product launches an application with a preferred user interface (UI) language on a device. The computer program product comprises a computer readable storage medium having program instructions embodied therewith, wherein the computer readable storage medium is not a transitory signal per se, and the program instructions executable by a computer to cause the computer to perform a method, comprising: receiving a voice command from a user to open an application on a device having a computer; comparing the voice command to stored command language in an audio file stored on a computer readable medium communicating with the device; initiating opening the application, in response to determining that the voice command matches the stored command language; identifying the application based on the voice command; determining a preferred language for the application based on a language file stored on the computer readable medium and the language file being associated with the stored audio file; and opening the application in response to the voice command, and setting the preferred language for a user interface (UI) of the device in response to the determined preferred language.

In another aspect according to the invention, a system launches an application with a preferred user interface (UI) language on a device. The system comprises: a computer system comprising: a computer processor, a computer-readable storage medium, and program instructions stored on the computer-readable storage medium being executable by the processor, to cause the computer system to perform a method, comprising: receiving a voice command from a user to open an application on a device having a computer; comparing the voice command to stored command language in an audio file stored on a computer readable medium communicating with the device; initiating opening the application, in response to determining that the voice command matches the stored command language; identifying the application based on the voice command; determining a preferred language for the application based on a language file stored on the computer readable medium and the language file being associated with the stored audio file; and opening the application in response to the voice command, and setting the preferred language for a user interface (UI) of the device in response to the determined preferred language.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawing are discussed forthwith below.

DETAILED DESCRIPTION

Figure 1:
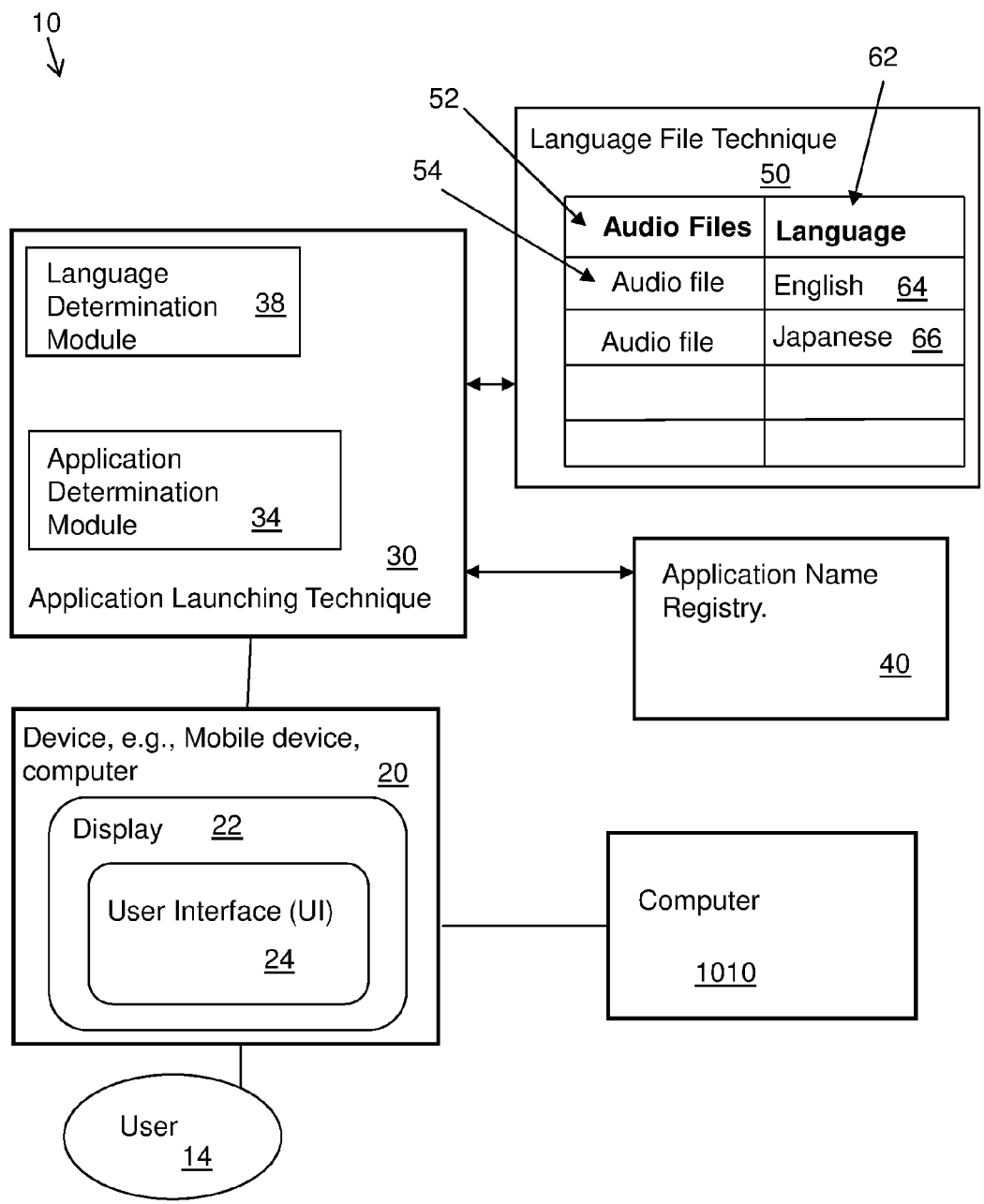
FIG. 1 is a schematic block diagram illustrating an overview of a system and methodology for launching an application with a preferred user interface language on a device according to an embodiment of the disclosure.

Referring to FIGS. 1, 2A, 2B and 3, a system 10 and method 100 are shown with reference to a functional system 200 for launching an application with a preferred user interface (UI) language on a device, according to an embodiment of the present invention. In one example, a user 14 using a hand held or mobile device 20 having a display 22, initiates a software application (also referred to as an application) stored on the device 20. The user can include a person who owns or operates the device. The device 20 includes a computer 1010, which is discussed in more detail with reference to FIG. 4 in relation to a computer system 1000. It is understood that the device 20 and the computer 1010 are representative or illustrative of many alternative computer devices and are presented here as generic representations for the purposes of the embodiment of the present invention. In the embodiment discussed below, for illustrative purposes, the method of the present disclosure is embodied in a computer program 1060 (FIG. 4) or a software application stored on the computer 1010 of the device 20. Alternative embodiments can include a computer program stored remotely (for example, on a remote server 1100 (FIG. 4)), and, for example, can be implemented as a service.

Figure 2A:
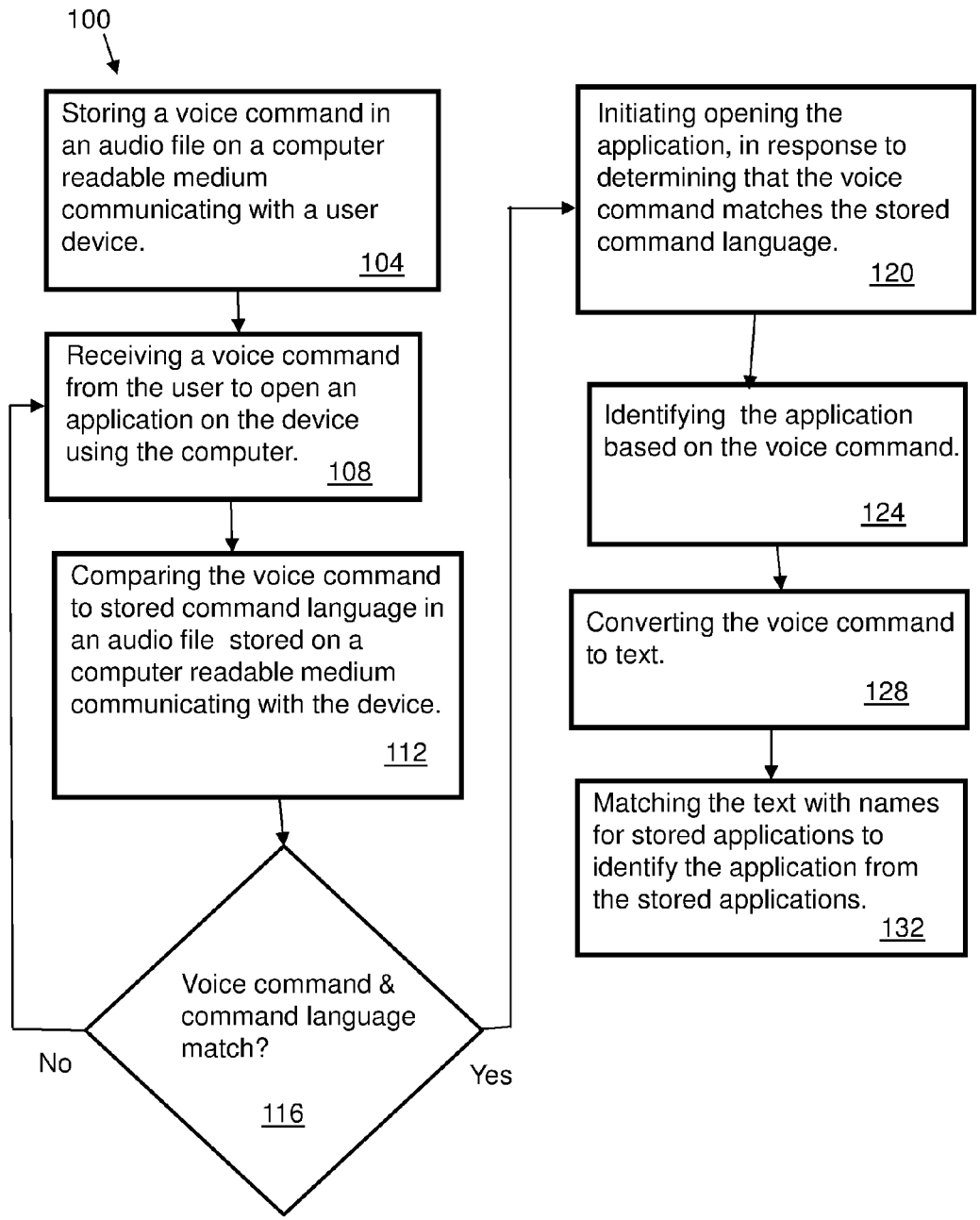
FIG. 2A is a flow chart illustrating a method for launching an application with a preferred user interface language on a device based on the system shown in FIG. 1, according to an embodiment of the disclosure.
Figure 2B:
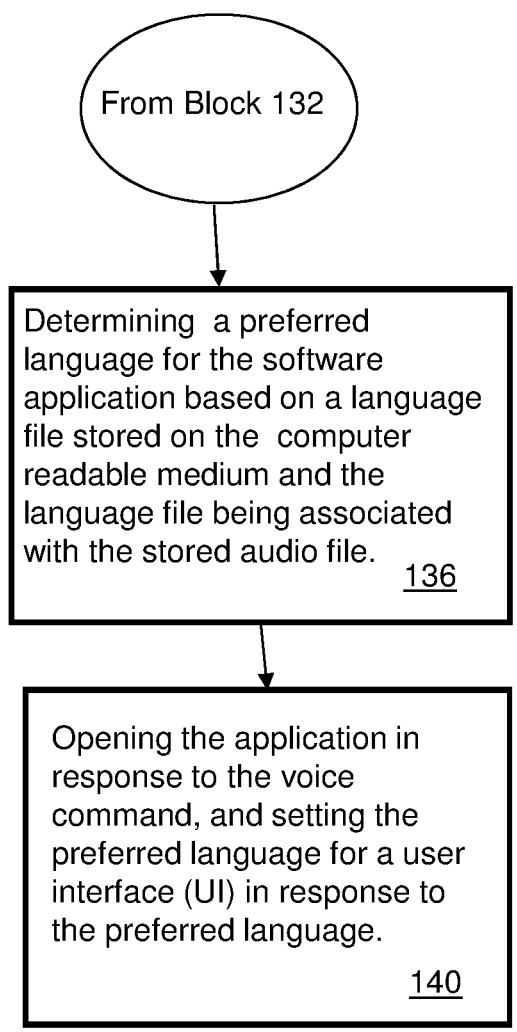
FIG. 2B is a flow chart continuing from FIG. 2A.
Figure 3:
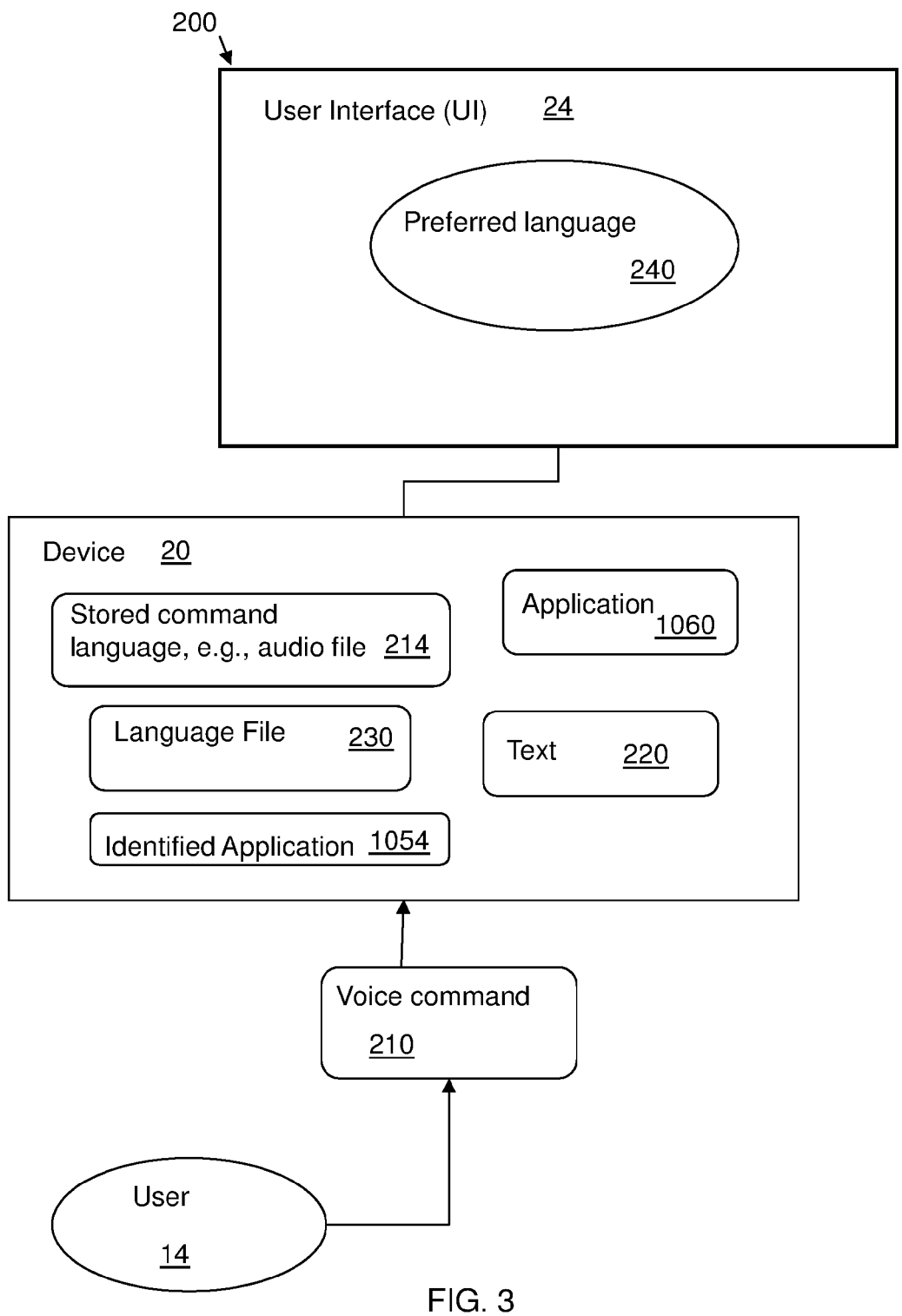
FIG. 3 is a functional block diagram depicting a system for launching an application with a preferred user interface language on a device according to the method and system shown in FIGS. 1 and 2A, 2B, according to an embodiment of the disclosure.

Referring to FIG. 2A, the method 100 includes storing command language 214 (FIG. 3) in an audio file 214 (FIG. 3) on a computer readable medium communicating with the user device 20, as in block 104. The method 100 further includes receiving a voice command 210 from the user 14, to open an application 1060 (FIGS. 3 and 4) on the device 20 using the computer 1010, as in block 108. The application 1060 is thereby selected (thus referred to as the selected application) by the voice command as described below. The application 1060 can be stored on a computer readable storage medium 1050 (FIG. 4) and is accessible by the device. The method 100 initiates opening the application 1060, or in other words, determines when to open the application 1060, in response to the voice command 210 based on comparing the voice command 210 to stored command language 214 in an audio file stored on a computer readable medium (for example, medium 1050 (FIG. 4)) communicating with the device 20, as in block 112. In the embodiment herein, the command language 214 stored in the audio file can be stored on a computer readable medium in the device 20. The stored command language identifies and provides the command language for opening the application in response to the voice command. In response to the voice command, the voice command is compared to the stored command language, and a determination is made whether the voice command and the stored command language match, as in block 116. When the voice command and the stored command language match (block 116), that is, are the same, the method initiates opening the identified application 1060 identified in the voice command 210, as in block 120. In one example, if a match is not detected at block 116, the method returns to block 108. Example techniques of determining when the voice command and the stored command language match can include comparing the voice command to the stored command language. In one example, the stored command language can be a passcode which can be a number, or a word, and an application translates and identifies the voice command as the number or word. Alternatively, in another example, the voice command can be compared to the stored command language, for example, by direct sound comparison, or for example, by translating each to a word or number and comparing for a match. In another example, a voice command can be compared iteratively through a list of stored voice files, initiating a voice comparison between the voice command and the stored voice files, to determine a best match between the voice command and the stored voice files for a voice command to command language match.

For instance, a voice recognition technique can identify the voice command as the stored command language, and the voice recognition technique can be used to identify the language spoken to select the UI language of the application. The command language can be a verb, for example, "open" or "launch". Each instance of a command language can have an associated target language. The associated target language is linked (by association) with the command language and can be set by the user at the time the user records the command language. The target language determines the language for the selected application that will be displayed on the UI.

In an embodiment of the present invention, the audio file of command language can be stored in a database, and the method can identify that the user spoke the command language in their voice command, and the language that was spoken. The target application can be identified by translating the voice command to text and identifying the application name with application names on the device, as described in more detail above.

More specifically, upon initiation of the opening the application, the method identifies the application based on the voice command 210, as in step 124 of FIG. 2A. In one example, the method identifies the application using the voice command by converting the voice command to text 220, as in block 128. In one example, an application launching technique 30 includes an application determination module 34 for converting the voice command to text (FIG. 1). The method then matches the text 220 with names for stored applications to identify the application 1060 from the stored applications, as in block 132. In one example, an application name registry 40 includes a list of stored applications on the device. The method can match the text 220 with names of the stored applications to identify the application selected by the voice command as described above in block 132 of the method 100.

The method includes determining a preferred language 240 for the software application based on a language file 230 stored on the computer readable medium and the language file being associated with the stored audio file 214, in block 136. In an example, a language determination module 38 of the application launching technique 30 can interact with a language file technique 50. The language file technique 50 can include a list of audio files 52 and a list of languages 62 associated with each of the audio files. The audio files 52, for example, include a stored audio file 54 recorded by a user recording the command language. Each of the audio files 54 are associated to a language, for example, English 64 and Japanese 66 under the list of languages 62. The language file is accessed to identify the preferred language. For instance the stored audio file 54 is associated to the English language 64.

More specifically, the comparing of the voice command to the stored command language stored in an audio file (block 112 of FIG. 2A), discussed above, can include matching the voice command to the stored command language in an audio file 54. The match can be indicated by determining that the same command language is used by the voice command as the stored voice command. The audio file can be accessed to determine the command language. For example, once a match between the command language and the voice command is detected, the application is opened by the device.

The method includes opening the application 1060 (as in block 140) in response to the voice command 210, and setting the preferred language 240 for the user interface (UI) 24 in response to the determination of the preferred language. The user interface can be the display of a device, or a user interface shown on the display 22 of the device 20 (as shown in FIG. 1), and can also refer to any user interface incorporating the embodiments of the present disclosure.

In one example, the embodiments of the present disclosure allow a user to open an application with a specified language without modify the OS location or language setting. The embodiments of the present invention further enhance the usability of the device by requiring fewer keystrokes per procedure when the user initiates opening an application with a specified a specific language.

In one or more embodiments according to the present invention, the audio file can be stored on the device, or alternatively, remotely to the device, for instance on a remote server.

In one or more embodiments, the voice command is a verbal command spoken by the user including one or more of: a word, a number, and a verbal utterance, also including but not limited to, a verbal sound, a spoken expression, a vocal expression, speaking, or any verbal noise from the user. The command language can be set by the user recording the command language in an audio file. The preferred UI language can be set by the user saving the command language. The user can select or set an associated target language for the audio file. The method and system of the present disclosure can provide an interface, for example, an application, a mobile application, or a web application, for configuring the associated language associated to the audio file which records the command language. For example, the user can record the command language to be saved in the audio file, and the user can use an interface to set or associate the associated target language for the command language saved in the audio file. Thus, when the user initiates a voice command which is matched to the command language, the interface language, initiated by the associated target language, is presented to the user via the UI.

In the embodiments of the present disclosure, it is beneficial for a user to select a language for an application shown on the user interface of a device without changing the operating system (OS) language or affecting other applications on the device. Changing the OS language can affect all the applications saved on a device when a user wants to only change the language for one application on the device, for example, a map application. For example, using an embodiment of the present disclosure, a user can have the OS language set to one language, for example, English, and one or more selected applications, for example, a map application or a social media application set to Chinese. In this instance, a user whose first language is Chinese may be more comfortable using a map in the Chinese language, but use other applications in the English language.

Other benefits of embodiments of the present disclosure include automatically detecting a user's preference for a preferred UI language for a specific application by voice matching the user's voice command to saved command language. Then, opening an application with a preferred language which is designated by a saved file associated with the saved command language.

Thus, the embodiments of the present disclosure enable a user to launch any application on the device with any respective user language. The device can include, but not limited to, a smartphone, or a handheld device.

In general, the embodiments of the present disclosure include automatically detecting a user's preferred UI language for an application selected by a user, by voice matching using the user's voice command compared to save command language. For example, for using a map application, a user talks into their device by using a voice command, and the method recognizes the voice command should launch the selected application in a preferred language, for example, Chinese. The method then launches the selected application on the device using Chinese as the interface language.

Figure 4:
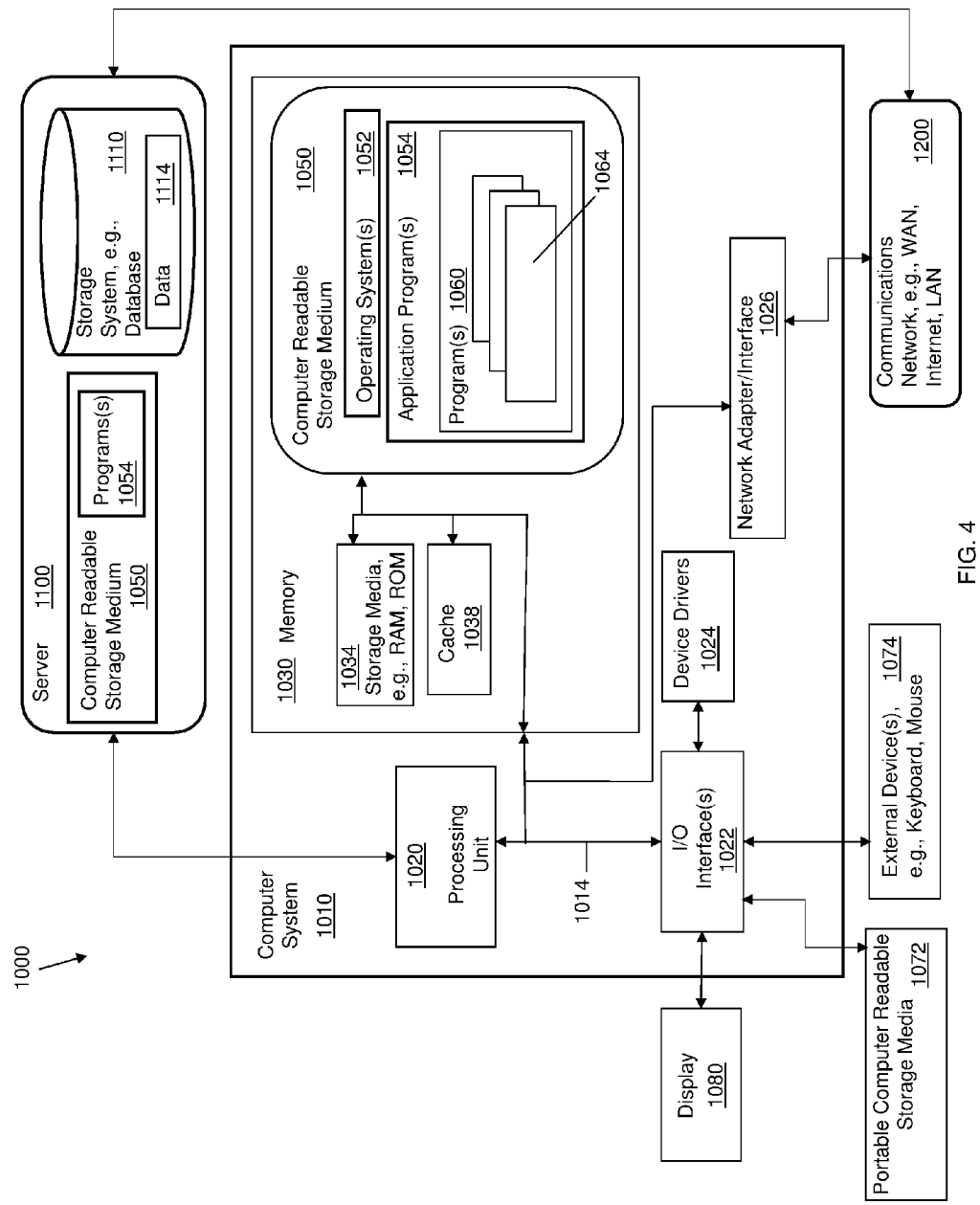
FIG. 4 is a schematic block diagram depicting a computer system according to an embodiment of the disclosure which includes a computer shown in FIG. 1, and cooperates with the system and method shown in FIGS. 1, 2A, 2B, and 3.

Referring to FIGS. 1 and 4, the device 20 includes a computer system 1010. The device 20 can be a computer, a hand held device, or a mobile device, or other types of computer devices. The device 20 can access a remote server 1100 using a communications network 1200 (e.g., the Internet) (FIG. 4). The computer system 1010 is a generic representation of a computer which may be embodied in a device such as a server for providing the method of the present disclosure as a service which can be accessible using the Internet or a network. The computer system is described in more detail below. The embodiments of the method of the present disclosure can be captured in a software application or program, for example, a program 1060 in the computer 1010. The program 1060 can be a separate application, and alternatively can be part (or integral with) of another application. The method can also be provided as a service which can be remote, for instance, including an application residing on a remote server exemplified by the remote server 1100.

Referring to FIG. 4, a system 1000 includes a computer system 1010 shown in the form of a generic computing device. The method 100, for example, may be embodied in a program 1060 (FIG. 4) embodied on a computer readable storage device, for example, generally referred to as memory 1030 and more specifically, computer readable storage medium 1050 as shown in FIG. 4. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 shown in FIG. 4 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 4 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 4, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 100 (FIG. 2), for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for launching an application with a preferred user interface (UI) language on a device, comprising:
   receiving a voice command from a user to open an application on a device having a computer and an operating system for the device, the operating system having a language setting;
   comparing the voice command to stored command language in an audio file stored on a computer readable medium communicating with the device;
   initiating opening the application, in response to determining that the voice command matches the stored command language;
   identifying the application based on the voice command;
   determining a preferred language for the application based on a language file stored on the computer readable medium using a language determination module on the computer, and the language file being associated with the stored command language in the stored audio file using an application determination module on the computer in communication with the language determination module;
   associating the command language to a preferred language as a target language linked by the association to the command language; and
   opening the application in response to the voice command, and setting the preferred language for the application for a user interface (UI) of the device in response to the determined preferred language for the application based on the association of the language file with the stored command language in the stored audio file, the setting of the preferred language for the application including not changing a preferred language for the operating system of the device thereby not requiring the device to change other applications or the operating system language.

2. The method of claim 1, further comprising:
   converting the voice command to text; and
   matching the text with names for stored applications to identify the application from the stored applications.

3. The method of claim 1, wherein comparing the voice command to the stored command language in the audio file includes:
   matching the voice command to the stored command language in the audio file by determining that the same command language is used by the voice command as the stored command language; and
   opening the application when the voice command matches the stored command language.

4. The method of claim 3, further comprising:
   accessing the language file to identify the preferred language, in response to the audio file being accessed for the determining of the voice command matching the stored command language.

5. The method of claim 1, wherein the audio file is stored on the device.

6. The method of claim 1, wherein the audio file is stored remotely with respect to the device.

7. The method of claim 1, wherein the voice command is a verbal command spoken by the user including one or more of: a word, a number, and a verbal utterance.

8. The method of claim 1, further comprising:
   setting the command language by the user recording the audio file; and
   setting the preferred UI language by the user saving the language file.

9. The method of claim 1, wherein the audio file is stored in a database.

10. The method of claim 1, wherein the voice command is received by a program stored on a computer readable medium on the device, and the program being executable by a computer in the device.

11. A computer program product for launching an application with a preferred user interface (UI) language on a device, the computer program product comprising a non-transitory computer readable storage medium having program instructions embodied therewith, the program instructions executable by a computer to cause the computer to perform a method, comprising:
   receiving a voice command from a user to open an application on a device having a computer and an operating system for the device, the operating system having a language setting;
   comparing the voice command to stored command language in an audio file stored on a computer readable medium communicating with the device;
   initiating opening the application, in response to determining that the voice command matches the stored command language;
   identifying the application based on the voice command;
   determining a preferred language for the application based on a language file stored on the computer readable medium using a language determination module on the computer, and the language file being associated with the stored command language in the stored audio file using an application determination module on the computer in communication with the language determination module;
   associating the command language to a preferred language as a target language linked by the association to the command language; and
   opening the application in response to the voice command, and setting the preferred language for the application for a user interface (UI) of the device in response to the determined preferred language for the application based on the association of the language file with the stored command language in the stored audio file, the setting of the preferred language for the application including not changing a preferred language for the operating system of the device thereby not requiring the device to change other applications or the operating system language.

12. The computer program product of claim 11, further comprising:
    converting the voice command to text; and
    matching the text with names for stored applications to identify the application from the stored applications.

13. The computer program product of claim 11, wherein comparing the voice command to the stored command language in the audio file includes:
    matching the voice command to the stored command language in the audio file by determining that the same command language is used by the voice command as the stored command language; and
    opening the application when the voice command matches the stored command language.

14. The computer program product of claim 13, further comprising:
    accessing the language file to identify the preferred language, in response to the audio file being accessed for the determining of the voice command matching the stored command language.

15. The computer program product of claim 11, wherein the voice command is a verbal command spoken by the user including one or more of: a word, a number, and a verbal utterance.

16. The computer program product of claim 11, further comprising:
    setting the command language by the user recording the audio file; and
    setting the preferred UI language by the user saving the language file.

17. A system for launching an application with a preferred user interface (UI) language on a device, the system comprising:
    a computer system comprising: a computer processor, a computer-readable storage medium, and program instructions stored on the computer-readable storage medium being executable by the processor, to cause the computer system to perform a method, comprising:
        receiving a voice command from a user to open an application on a device having a computer and an operating system for the device, the operating system having a language setting;
        comparing the voice command to stored command language in an audio file stored on a computer readable medium communicating with the device;
        initiating opening the application, in response to determining that the voice command matches the stored command language;
        identifying the application based on the voice command;
        determining a preferred language for the application based on a language file stored on the computer readable medium using a language determination module on the computer, and the language file being associated with the stored command language in the stored audio file using an application determination module on the computer in communication with the language determination module;
        associating the command language to a preferred language as a target language linked by the association to the command language; and
        opening the application in response to the voice command, and setting the preferred language for the application for a user interface (UI) of the device in response to the determined preferred language for the application based on the association of the language file with the stored command language in the stored audio file, the setting of the preferred language for the application including not changing a preferred language for the operating system of the device thereby not requiring the device to change other applications or the operating system language.

18. The system of claim 17, further comprising:
converting the voice command to text; and
matching the text with names for stored applications to identify the application from the stored applications.

19. The system of claim 17, wherein comparing the voice command to the stored command language in the audio file includes:
    matching the voice command to the stored command language in the audio file by determining that the same command language is used by the voice command as the stored command language; and
    opening the application when the voice command matches the stored command language.

20. The system of claim 19, further comprising:
accessing the language file to identify the preferred language, in response to the audio file being accessed for the determining of the voice command matching the stored command language.

* * * * *